United States Patent [19]

Worden et al.

[11] Patent Number: 4,819,414
[45] Date of Patent: * Apr. 11, 1989

[54] APPARATUS FOR FORMING A TUBE FROM POLYFOIL WEB FOR HIGH CAPACITY ASEPTIC FORM, FILL, AND SEAL MACHINES

[75] Inventors: Donald G. Worden, Sheboygan; Kenneth Storm, Glendale, both of Wis.

[73] Assignee: International Paper Company, Purchase, N.Y.

[*] Notice: The portion of the term of this patent subsequent to Mar. 22, 2005 has been disclaimed.

[21] Appl. No.: 137,185

[22] Filed: Dec. 23, 1987

Related U.S. Application Data

[63] Continuation of Ser. No. 942,849, Dec. 17, 1986, Pat. No. 4,731,980.

[51] Int. Cl.⁴ ............................................... B65B 9/08
[52] U.S. Cl. ........................................ 53/551; 53/550; 493/302; 493/434
[58] Field of Search ........... 53/551, 550, 548, DIG. 2, 53/451, 450, 477; 493/302, 434, 435, 442, 197, 196, 195, 194, 193

[56] References Cited

U.S. PATENT DOCUMENTS

| | | | |
|---|---|---|---|
| 3,777,632 | 12/1973 | Pepmeier | 493/302 X |
| 3,913,299 | 10/1975 | Stenstrom | 53/551 X |
| 4,136,505 | 1/1979 | Putnam, Jr. et al. | 53/551 |
| 4,317,321 | 3/1982 | Torterotot et al. | 493/302 X |
| 4,614,078 | 9/1986 | Kawabe | 53/551 |

Primary Examiner—James F. Coan
Attorney, Agent, or Firm—Robert M. Isackson

[57] ABSTRACT

Improved form, fill, and seal machine for making aseptic sealed packages incorporating a plurality of web guiding rollers and flanges for manipulating a continuously fed polyfoil web into a longitudinal tube having a triangular cross section and opposing superimposed web edges that are sealed together to form the longitudinal seal in the tube. Web advance may be continuous or intermittent. Induction heating is used to longitudinally seal the edges of the web together to form a tube.

13 Claims, 14 Drawing Sheets

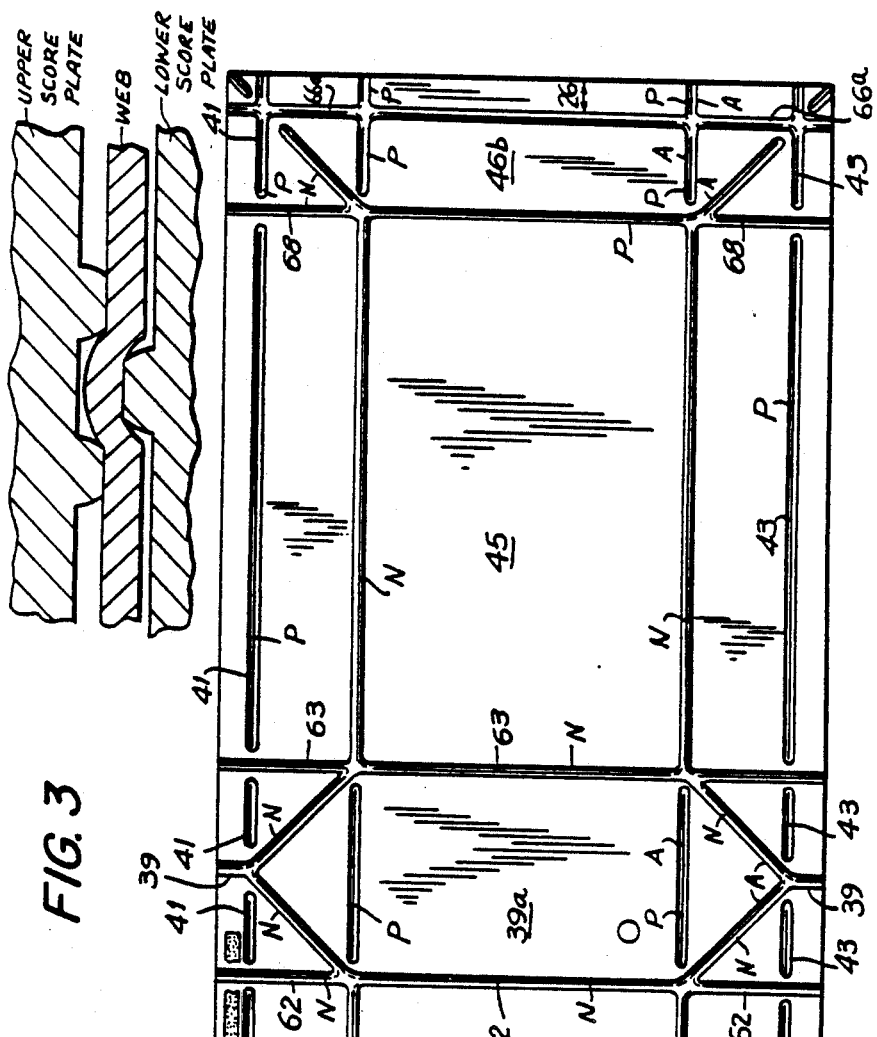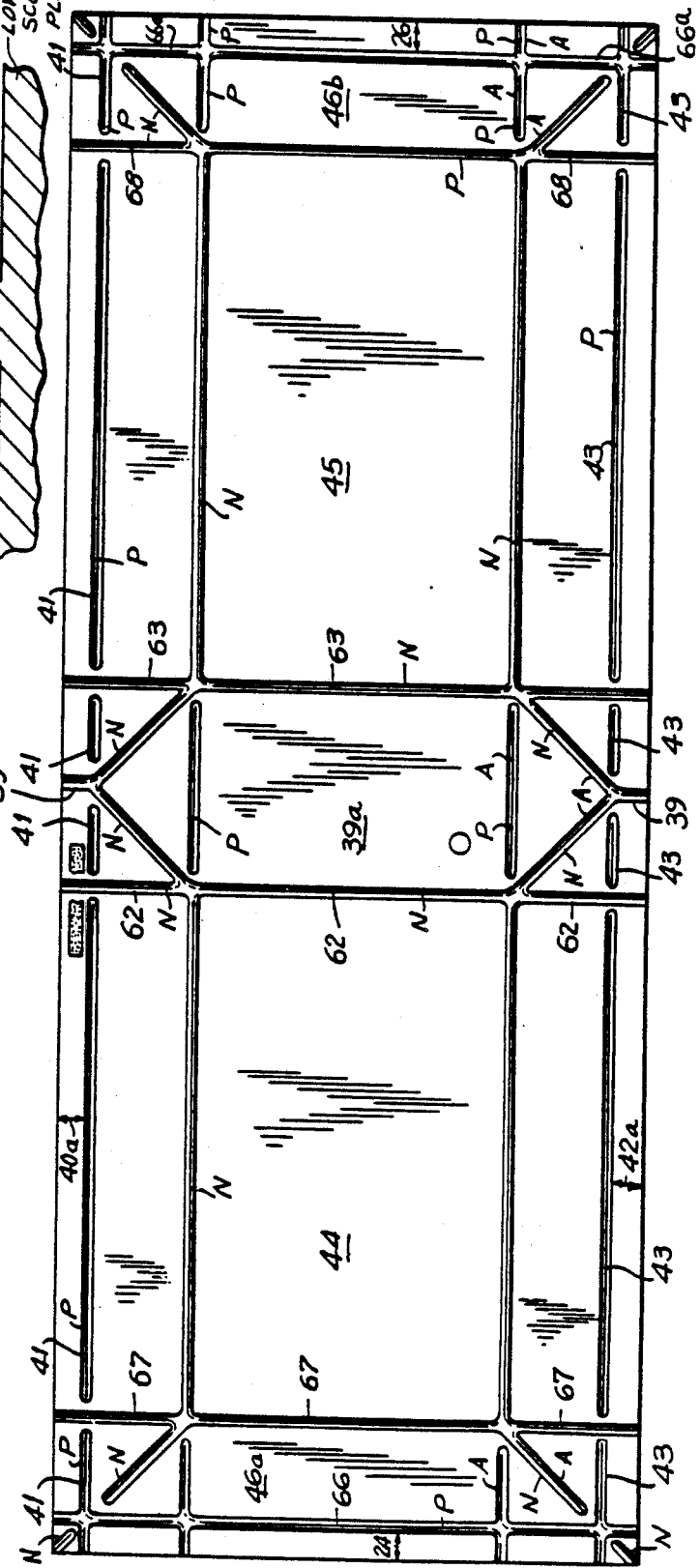
FIG. 3
FIG. 2

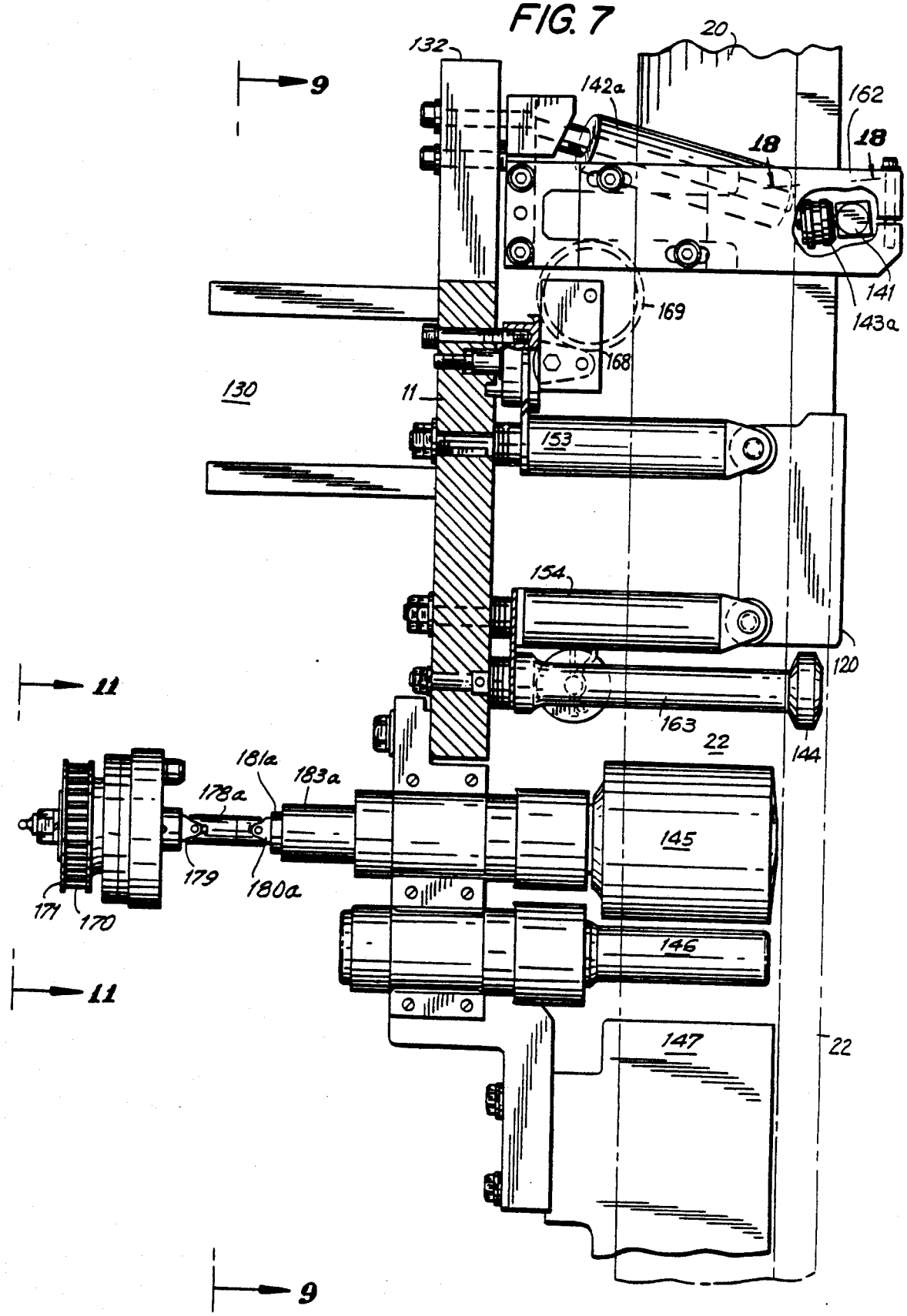

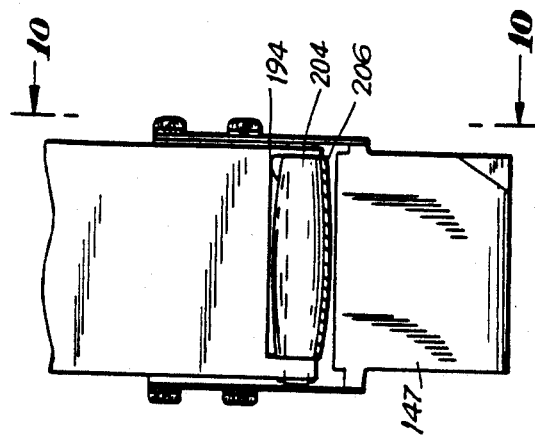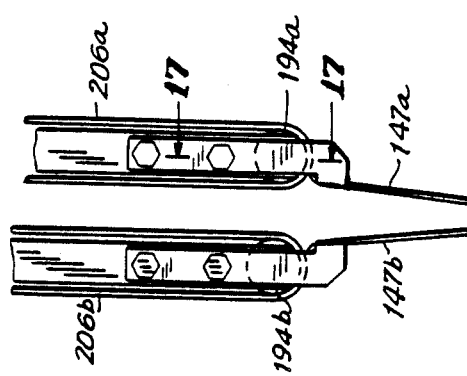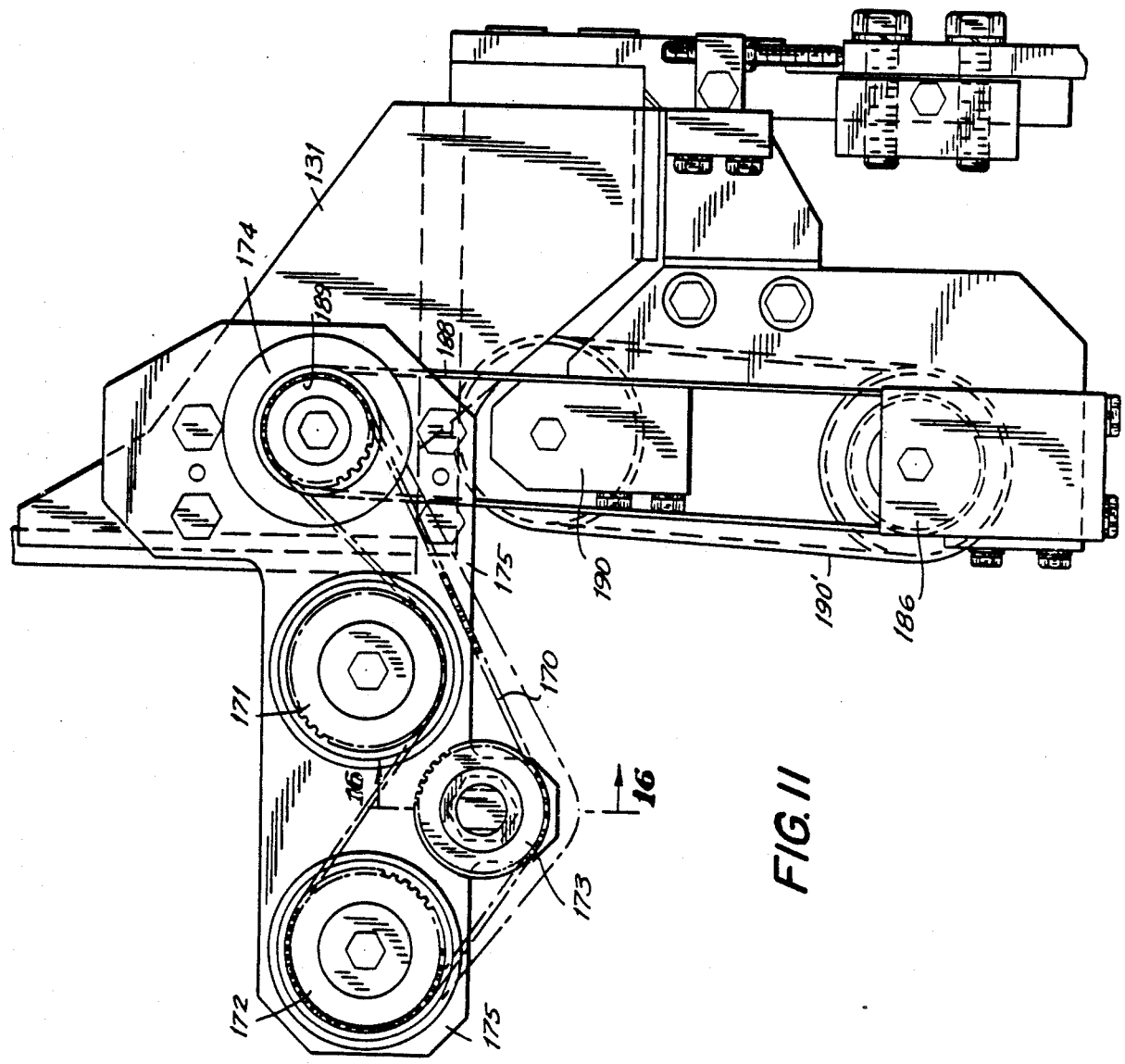

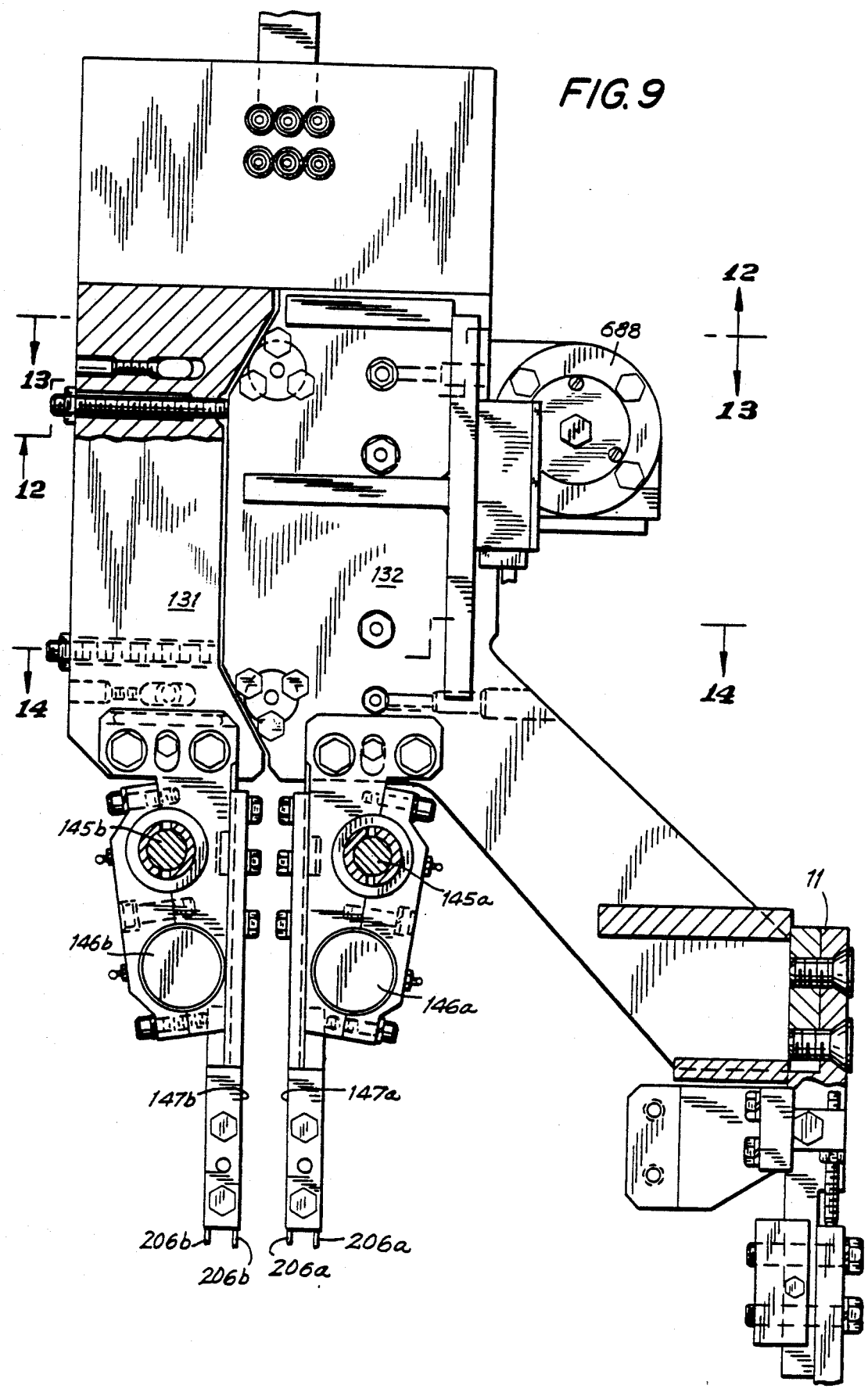

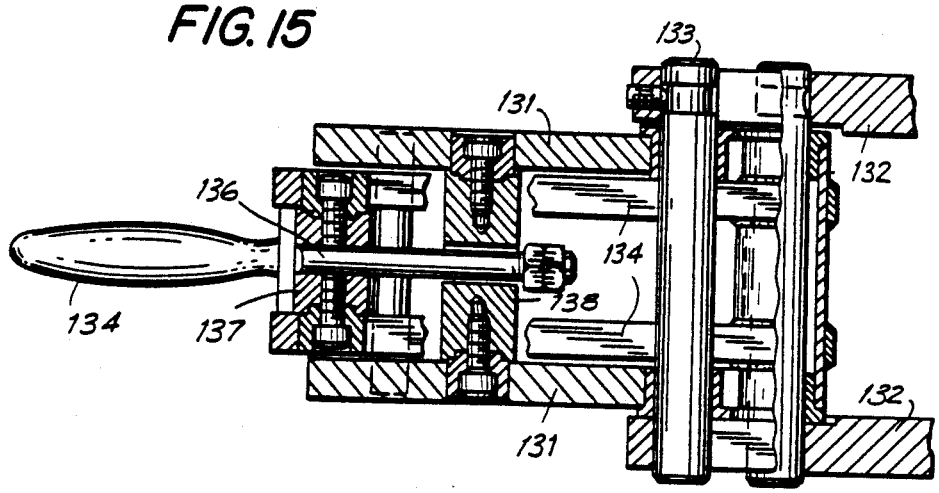
FIG. 15
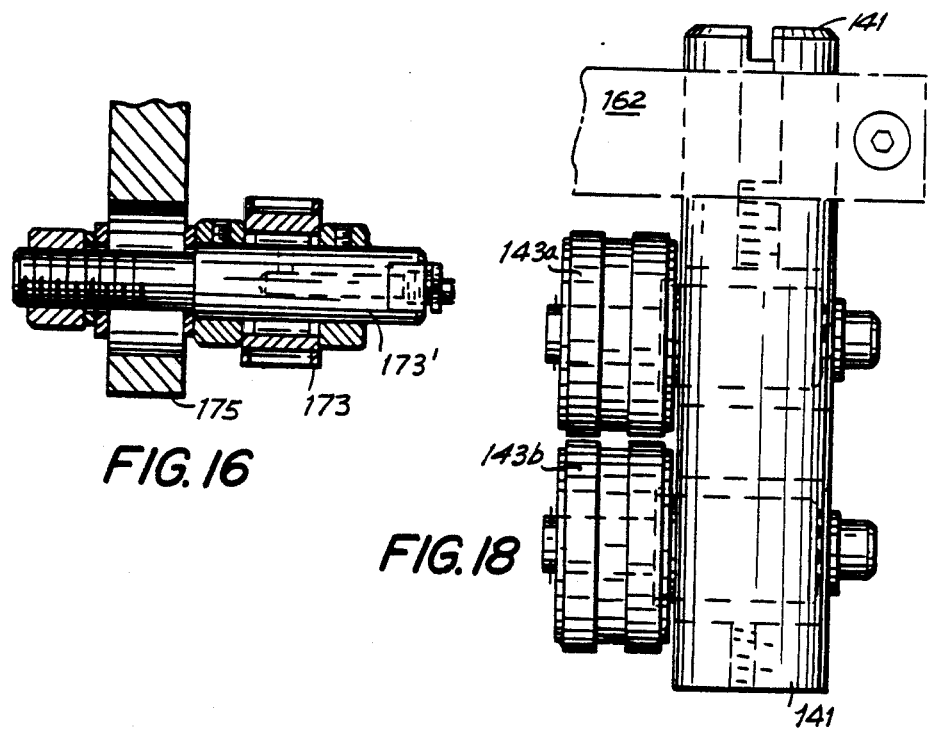
FIG. 16
FIG. 18
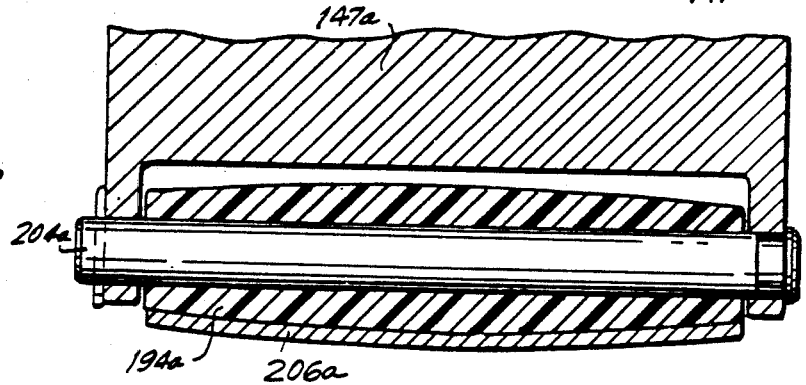
FIG. 17

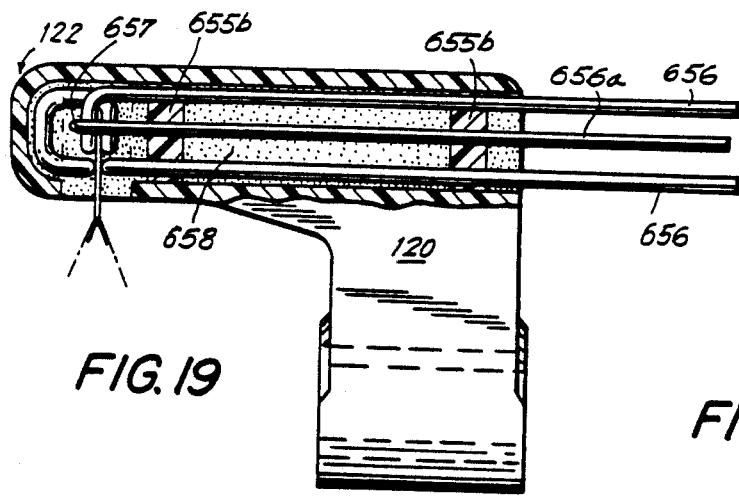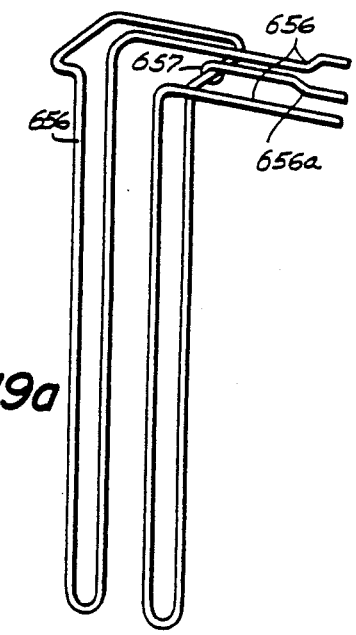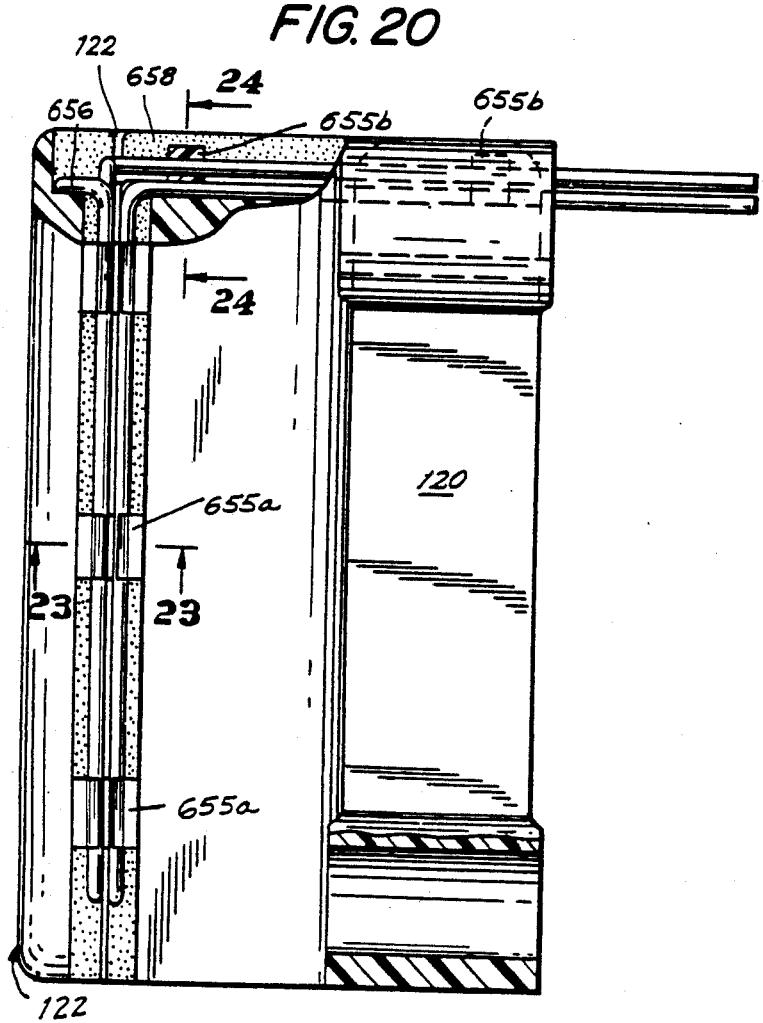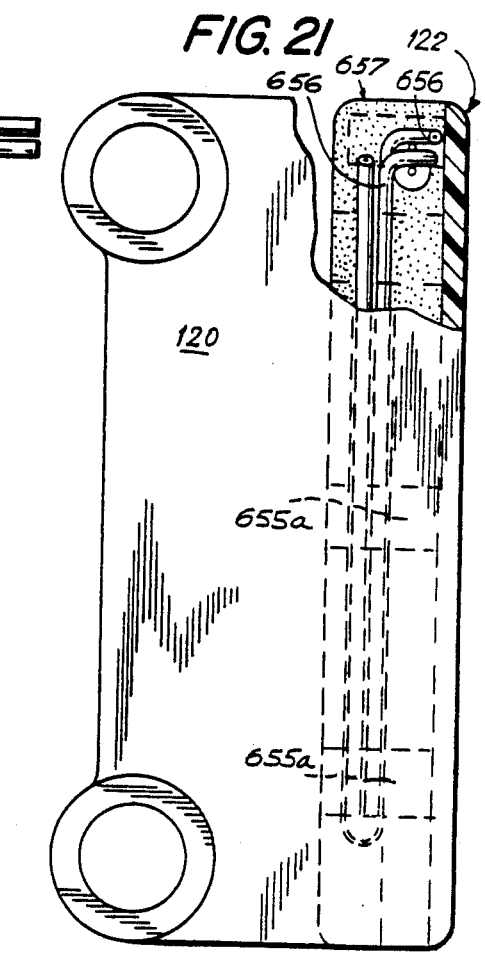
FIG. 19
FIG. 19a
FIG. 20
FIG. 21

APPARATUS FOR FORMING A TUBE FROM POLYFOIL WEB FOR HIGH CAPACITY ASEPTIC FORM, FILL, AND SEAL MACHINES

This is a continuation of application Ser. No. 942,849 filedDec. 17, 1986 in the names of Donald G. Worden and Kenneth Storm entitled IMPROVED APPARATUS FOR FORMING A TUBE FROM POLYFOIL WEB FOR HIGH CAPACITY ASEPTIC FORM, FILL, AND SEAL MACHINES, when issued as U.S. Pat. No. 4,731,980.

This invention relates to apparatus for manipulating a web of material into a sealed tube at high rates of speed, particularly to an improved apparatus for manipulating a continuously advancing polyfoil web material to form a tube which can be filled with a product and transversely sealed into aseptic packages.

BACKGROUND OF THE INVENTION

Aseptic packages refer to sealed containers containing a substantially uniform predetermined amount of a product made in accordance with commercial aseptic packaging standards. Commercial aseptic packaging involves introducing a sterile product into a sterile container and then hermetically sealing the container in an environment substantially free of microorganisms capable of growing in a shelf stable product at temperatures at which the finished product is likely to be stored during distribution and storage prior to consumption. Hermetically sealed containers minimize the the transmission of any gas or fluid through the container package so that there is substantially no biological transmission. Preferably, the package is also substantially free of air which, if present in significant amounts, could promote undesired microbial growth or, even in the absence of microbial growth, adversely affect the taste or color of a product. Typical products are fluent materials, specifically, a fluid drink such as pasturized milk, fruit juices, and the like.

The sterile containers commonly comprise a laminated web packaging material preferably having at least one layer of current carrying material such as aluminum foil, a first exterior layer of thermoplastic material to become the package intrerior in contact with the product, and a second exterior layer of material for contact with the environment. The laminated material, also referred to herein as "polyfoil web", is typically strong enough to stand upright in a somewhat rigid finished configuration to contain the product for shipping and storage, and commonly includes a conventional paperboard structural layer. Product labeling may be printed on the paperboard layer or the outer thermoplastic layer. Regarding the invention described below, the most preferred polyfoil web to use comprises a laminate of, in order, a layer of low density polyethylene, paper stock, Surlyn®, aluminum foil, Surlyn®, and linear low density polyethylene. The low density polyethylene layer could also be a high density polyethylene, and the linear low density polyethylene layer could also be a low density polyethylene.

The thermoplastic material forming the package interior must be capable of being sealed together to form hermetic seals. Typically, opposing thermoplastic layers are heated to a melting temperature so that they will fuse together. The thermoplastic and metallic foil layers act in concert to provide the hermetic barrier for the aseptic package. The metallic foil layer provides a light and oxygen barrier. The outer layer is commonly a thermoplastic material that can be heated so that the excess material formed during final forming or bricking of the packages can be flattened or tacked against the package sidewalls to form an aesthetically pleasing package. Such polyfoil laminates may include spaced access means to enable the user to readily extract the product from the finished package.

Several methods and machines for forming aseptic and non aseptic packages or cartons from paper stock and laminated web materials are known. These methods and machines generally fall into two categories, blank fed and web fed.

In blank fed machines, the supply of web first is separately formed into cut and scored blanks. The blanks are then fed into the forming section of the machine one at a time and erected into containers. One commercial blank fed aseptic machine is Combiblok, Model No. CF 606A.

In web fed machines, the web is taken diectly off the roll of flat web stock, scored (unless prescord), and fed into the machine. The machine then folds the web about a forming means, for example a square or tubular forming mandrel, a circular wire guide means, or a series of guide rollers and stationary guide means to form a longitudinally extending column. The longitudinal edges are then sealed together to form a tube. The tube is filled with a product, and then clamped, sealed, and severed transversely to form packages which can be formed into a brick shape.

The web advance may be continuous, to gradually manipulate the web into sealed packages, or intermittent, to perform each forming and sealing operation either while the web is stationary or while the web is moving between stations. The sealing steps typically involve thermally sealing thermoplastic materials together to form an hermetic seal. Thermal sealing is brought about by using, for example, radiant heat and means for pressing the heated materials together, opposing heated contacting members such as nichrome wires, or induction heating coils (for webs having a conductive layer integrated therein or applied thereon). One commercial automatic continuous feed aseptic machine is Tetra-Pak Model AB 9. Other known aseptic machines include International Paper Co.'s web fed aseptic package machine, Model SA.

The primary problem with the aformentioned forming, filling, and sealing machines is that they are limited in the machine speed and web control required to continuously or intermittently make aseptic packages at a rate of speed higher than presently obtainable in an economically efficient manner. The present invention relates to an improvement in web fed type machines, and is designed to have a production rate substantially higher than that of presently known machines.

Intermittent and continuous advance web fed machines are limited by the rate at which the web can be advanced and formed into a longitudinally advancing tube and then sealed and severed transversely into packages.

It is therefore an object of this invention to provide an improved method and apparatus for forming a flat web of polyfoil material into a longitudinally advancing tube at high rates of speed. It is also an object to provide such a method and apparatus for tube forming under aseptic conditions.

It is another object to manipulate the web into a substantially triangular configuration in preparation for forming a tube in order to facilitate package forming. It is also an object to provide a forming roller at the base of the triangular configuration to reduce the number of fold lines present in the final rectangular package and aid in aligning the edges to be sealed together.

SUMMARY OF THE INVENTION

In order to overcome the problems and limitations of the traditional form, fill, and seal machines, the present invention provides an improved apparatus for manipulating a continuously advancing web of polyfoil material into a pie-shaped or triangular cross section with opposing edges in alignment and longitudinally sealing the edges together into a tube using a stationary longitudinal seal induction coil and a supply of electromagnetic enery to inductively heat the edges of the polyfoil web which are urged together to form the longitudinal seal.

In accordance with the present invention, the polyfoil web edges to be sealed together are manipulated by web guiding rollers and flanges to overlap in close proximity or in touching contact, preferably arranged thermoplastic layer to thermoplastic layer with a thermoplastic layer being adjacent the current carrying layer of the polyfoil and the product contacting thermoplastic layer forming the tube interior. The area to be sealed is then subjected to an electromagnetic field which must have sufficient energy to induce a current in the current carrying layer of the polyfoil. The induced currents, which may or may not be uniform, must have an aggregate density and dwell time in the current carrying layer sufficient to heat that layer resistively, and thereby melt conductively the adjacent, proximate or contacting opposing thermoplastic layers. The melted thermoplastic materials are then fused together preferably by the application of a physical force—mechanical, magnetic, or some combination thereof—and allowed to cool to form a hermetic seal. In an alternate embodiment, a thermoplastic adhesive may be applied between the layers to be sealed together and the heat generated in the current carrying layer used to activate the adhesive to seal the layers together.

The longitudinal seal induction coil is preferably an elongated coil folded about the web edges which pass between the current carrying faces of the coil. This configuration provides a concentrated electromagnetic field interior to the elongated current carrying conductors extending the length or height of the longitudinal seal coil, and induces currents in the polyfoil which generate heat to melt the thermoplastic layer of the polyfoil. The electromagnetic field also may generate opposing magnetic forces on the opposing current carrying layers of the polyfoil which attract to urge the layers together.

In the preferred embodiment, the longitudinal seal is formed one segment at a time while the web is continuously advanced. A control system may be used to energize intermittently the longitudinal seal coil for a period of time sufficient to melt a length of web for forming a tube section. The deenergized time periods are determined so that the control system may again energize the longitudinal seal coil before the trailing edge of the preceding melted tube segment passes beyond the effective range of the energized electromagnetic field to melt another length of web into tube, so that adjacent lengths overlap. Thus, the length of the seal coil, the energized time period and the period between energizations, the rate of web advance and the effective electromagnetic field intensity interrelate and must be adjusted so that the aggregate exposure time the advancing web is subjected to the effective electromagnetic field will permit sealing the thermoplastic all along the web length. The control system also may control other induction coils which operation does not form a part of this invention.

The present invention also can be adapted for machines that intermittently advance a continuous web by energizing the vertical seal coil while the web is being advanced as described above, or while the web is stationary. In this embodiment, the length of advancement must be less than a vertical seal segment length to ensure that adjacent segments overlap. The present invention can also be adapted for continuous energization of the longitudinal seal coil for continuous advance operation.

In the preferred embodiment, radio frequency currents are used from a single R-F generator. Radio frequency current permits using a thin current carrying layer in the polyfoil material because the current flowing in the conductor is concentrated in a relatively-thin cross sectional area at the conductor surface in accordance with the well known skin depth phenomenon. Therefore, thin conductors can be used so that the current induced in the polyfoil will quickly pass throughout the foil layer of the polyfoil, and evenly heat that layer resistively, resulting in a shorter sealing time than would be necessary to heat a conductor having excess material. Further, thin longitudinal seal coils could be used making the equipment less massive and easier to cool.

The r-f generator and circuit control means continue to deliver the appropriate power to make the longitudinal seal segmentally or continuously, depending upon the web, the coil design, the rate of speed of the web and power capacity of the r-f generator used. The control circuit may be configured to deliver power alternately to the longitudinal seal coil and to an induction coil adapted for sealing the formed tube transversely.

A typical form, fill, and seal machine utilizing the present invention may include a roll of continuous web stock; a web scoring means; a sterilizing medium, e.g., hydrogen peroxide, and a means for applying the sterilizing medium to the web for the time and at the temperature required to sterilize the web, if aseptic packaging is desired; the tube forming section of the present invention for manipulating the web into a triangular tube with the longitudinal edges arranged in alignment and opposition including a vertical induction coil for sealing the longitudinal edges, and a source of sterile air for maintaining the sterility of the tube forming section; filler tubes for introducing a product into the tube as the tube advances at a controlled rate; one or more sealing mechanisms mounted on a means adapted to clamp the tube transversely sequentially to envelope the desired amount of product, each sealing mechanism having a transverse induction coil for sealing the clamped tube when energized; a severing means mounted in each sealing mechanism for severing the transverse seal to separate the sealed package from the tube; an induction generator, preferably a radio frequency induction generator, and coupling means for providing electromagnetic energy to energize the vertical and transverse coils; conventional drive means for controlling the web advance and the speed of the sealing mechanisms and other forming apparatus; and a microprocessor for controlling machine operation in accordance with a predetermined set of operating conditions.

It is to be understood that while the present invention is discussed in the content of producing a tube for use in forming quarter-liter aseptic packages, one skilled in the art could use the apparatus in other areas including, but not limited to, forming longitudinal tubes for packages of different sizes, non-aseptic packages, or packages that must be kept refrigerated, as well as intermittent advance continuous web feed type machines. Therefore, the foregoing and following description is to be viewed as illustrative and not in a limiting sense.

BRIEF DESCRIPTION OF THE DRAWINGS

FIG. 2 is a top view of a polyfoil web material corresponding to one package, after scoring, for use in accordance with the present invention.

FIG. 3 is a cross-sectional view of the scoring section of the machine of FIG. 1.

FIG. 5a is a cross-sectional view of FIG. 5 taken along line 5a—5a.

FIG. 7 is a rear sectional view of the web folding and vertical seal section of the machine of FIG. 1.

FIG. 8 is a side view of the lower guide portion of the web folding and vertical seal section of FIG. 7.

FIG. 9 is a side sectional view of FIG. 7 taken along line 9—9.

FIG. 10 is a front view of FIG. 8 taken along line 10—10.

FIG. 11 is a side sectional view of FIG. 7 taken along line 11—11.

FIG. 15 is a side sectional view of FIG. 13 taken along line 15—15.

FIG. 16 is a front sectional view of FIG. 11 taken along line 16—16.

FIG. 17 is a rear sectional view of FIG. 10 taken along line 17—17.

FIG. 18 is a top sectional view of FIG. 7 taken along line 18—18.

FIGS. 19, 20, and 21 are respectively the top, side, and rear sectional views of the vertical seal induction coil, relative to the views of FIG. 1, in accordance with the present invention.

FIG. 19a is an elevated perspective view of the vertical seal induction coil of FIG. 19.

DETAILED DESCRIPTION OF THE INVENTION

Figure 1:
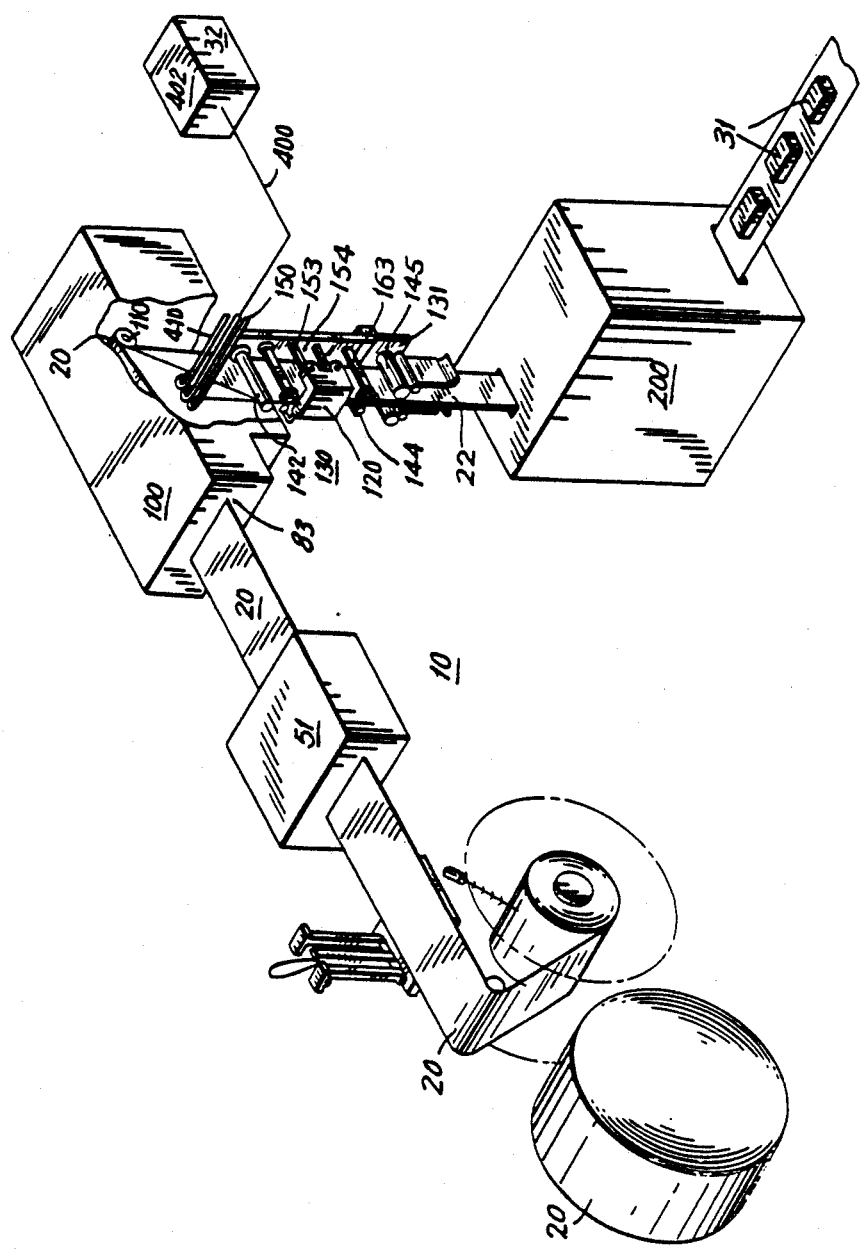
FIG. 1 is an elevaed perspective view of an aseptic package forming, filling, and sealing machine adapted for using the present invention.
Figure 5:
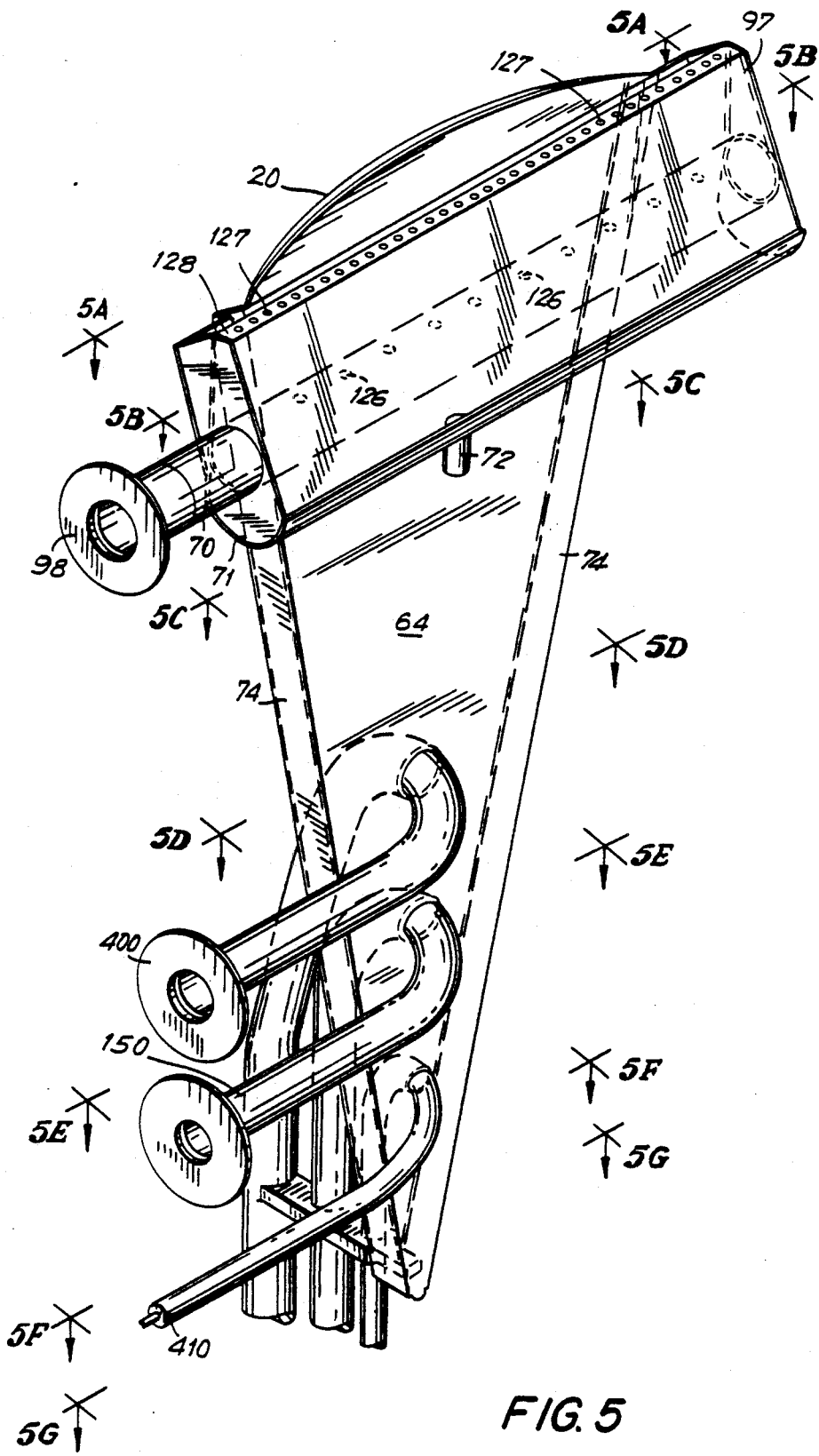
FIG. 5 is an elevated perpsective view of the web folding section of the machine of FIG. 1.
Figure 5A:
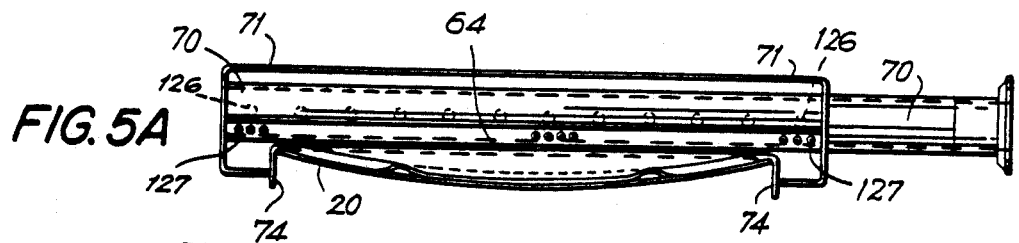
Figure 5B:
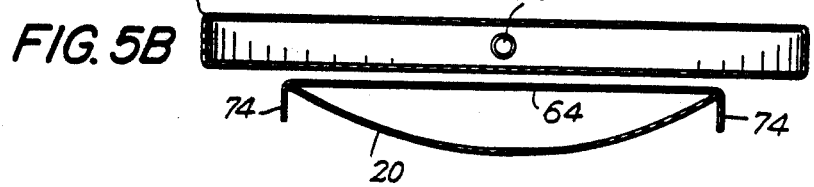
FIG. 5b is a cross-sectional view of FIG. 5 taken along line 5b—5b.
Figure 5C:
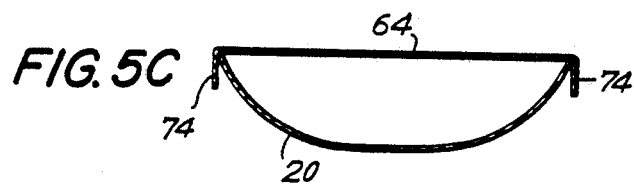
FIG. 5c is a cross-sectional view of FIG. 5 taken along line 5c—5c.
Figure 5D:
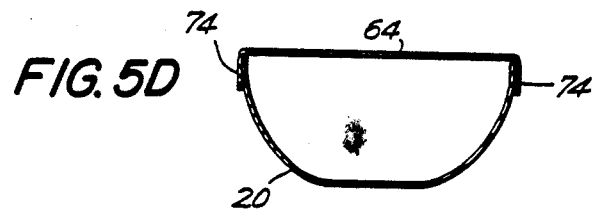
FIG. 5d is a cross-sectional view of FIG. 5 taken along line 5d—5d.
Figure 5E:
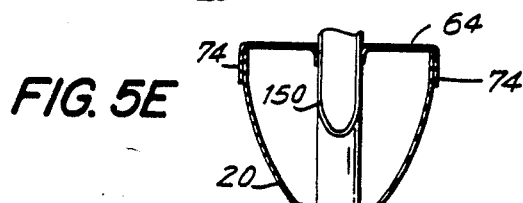
FIG. 5e is a cross-sectional view of FIG. 5 taken along line 5e—5e.
Figure 5F:
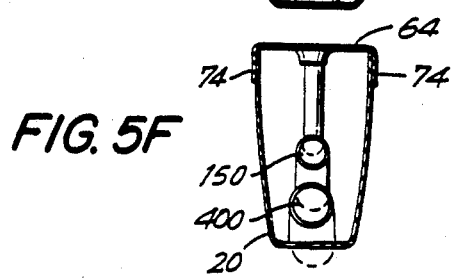
FIG. 5f is a cross-sectional view of FIG. 5 taken along line 5f—5f.
Figure 5G:
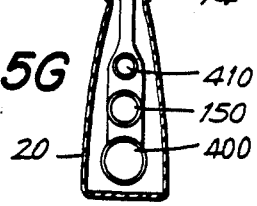
FIG. 5g is a cross-sectional view of FIG. 5 taken along line 5g—5g.

As shown in FIGS. 1, 5, and 7 an illustrative embodiment of this invention is useful in connection with form, fill, seal, and brick machine 10, which may be a microprocessor controlled apparatus that produces finished polyfoil packages 31 filled with product 32 by passing polyfoil web 20 into machine 10 through scoring area 51, passing scored web 20 into area 100, cleaned and preferably presterilized, to sterilize web 20, forming web 20 into polyfoil tube 22 by sealing web edges 24 and 26 (FIG. 2) together in vertical seal area 130, filling tube 22 with product 32 through filler tube 400 without introducing air into product filled tube, passing filled tube 22 into package forming means 200. Package forming means 200 is adapted for transversely clamping, sealing, and severing tube 22 into discrete preformed packages (not shown) which are then formed into finished containers 31 by package processing apparatus (not shown), and may use one or more sealing mechanisms to carry out these operations. Machine 10 may be driven intermittently or, preferably, continuously, in a controlled fashion as known to those of skill in the art.

Web 20 may be scored conventionally, e.g., using coacting scoring rollers as it is taken off the supply or before being rolled into a supply of web. See FIGS. 2 and 3. The scoring provides positive score lines P and negative score lines N so that the web is predisposed to being folded in a particular direction at particular locations, based on the score patterns, and can be consistently folded into the desired finished brick.

For aseptic packaging, the web may be conventionally cleaned and then sterilized in sterilization area 100 and maintained in a sterile environment at least until after the product containing package is completely transversely sealed in accordance with known procedures not forming a part of the present invention. Sterile air is blown inside of tube 22 to maintain aseptic sterility of the product filled tube after the web is sterilized and before the tube is filled and sealed transversely.

Preferably, the longitudinal seal is made by manipulating, bending or curving flat web 20 as it advances along a guide means so that the edges are aligned longitudinally and the inside thermoplastic layers of opposing web edges are sealed together. A heat activated adhesive placed between two opposing web pieces could be used instead of inductively heating the exterior thermoplastic layer.

Referring to FIGS. 1, 4, 5, and 5a–5g, in the preferred embodiment web 20 is pulled out of the sterilization section over guide roller 110 and across web guide plate 64 having flanges 74 so that web edges 24 and 26 are restrained by the side flanges of guide 74. The flanges are at an angle to plate 64, extending in the same direction. The angle must be sufficient to catch and restrain the edge of web 20, e.g., at acute or right angles. Flanges 74 are configured to be brought closer togethr as they extend along plate 64 to cause web 20 to curve. Preferably, the flanges are angled longitudinally relative to each other to form a v-shape.

Web 20 is brought into contact with plate 64 so that as the web edges advance along plate, flanges 74 get closer to each other and gradually increase the concavity of the inside of web 20 until it bends over with web edges 24 and 26 becoming aligned and superimposed (FIG. 4) with the balance of the bent web having a pie-shaped or triangular cross sectional configuration. The cross sectional configuration is in part predetermined by the score lines in the web and the rollers and forms used to manipulate the web into tube 22.

The triangular configuration provides for forming one side of the package panel, e.g., what will be the top panel in the preferred embodiment, without having to use large amounts of force required to form the four carton sides at once on a rectangular mandrel or to convert a tubular column to a rectangular column. It also eliminates the presence of some seams, or fold lines in the web which detract from the commercial acceptance of the finished package. Further, the triangular configuration desirably reduces the number of surfaces that must be controlled to advance the web rapidly and control the alignment of the web edges as it is longitudinally sealed.

Air knife 97, emitting a stream of sterile air from conduit 98 is directed at web 20 at about the location it exits sterilization section 100 to vaporize any residual sterilizing medium. Air knife 97 also provides vent 72 for passing sterile air into the sterile chamber to help maintain a positive sterile air pressure.

Figure 12:
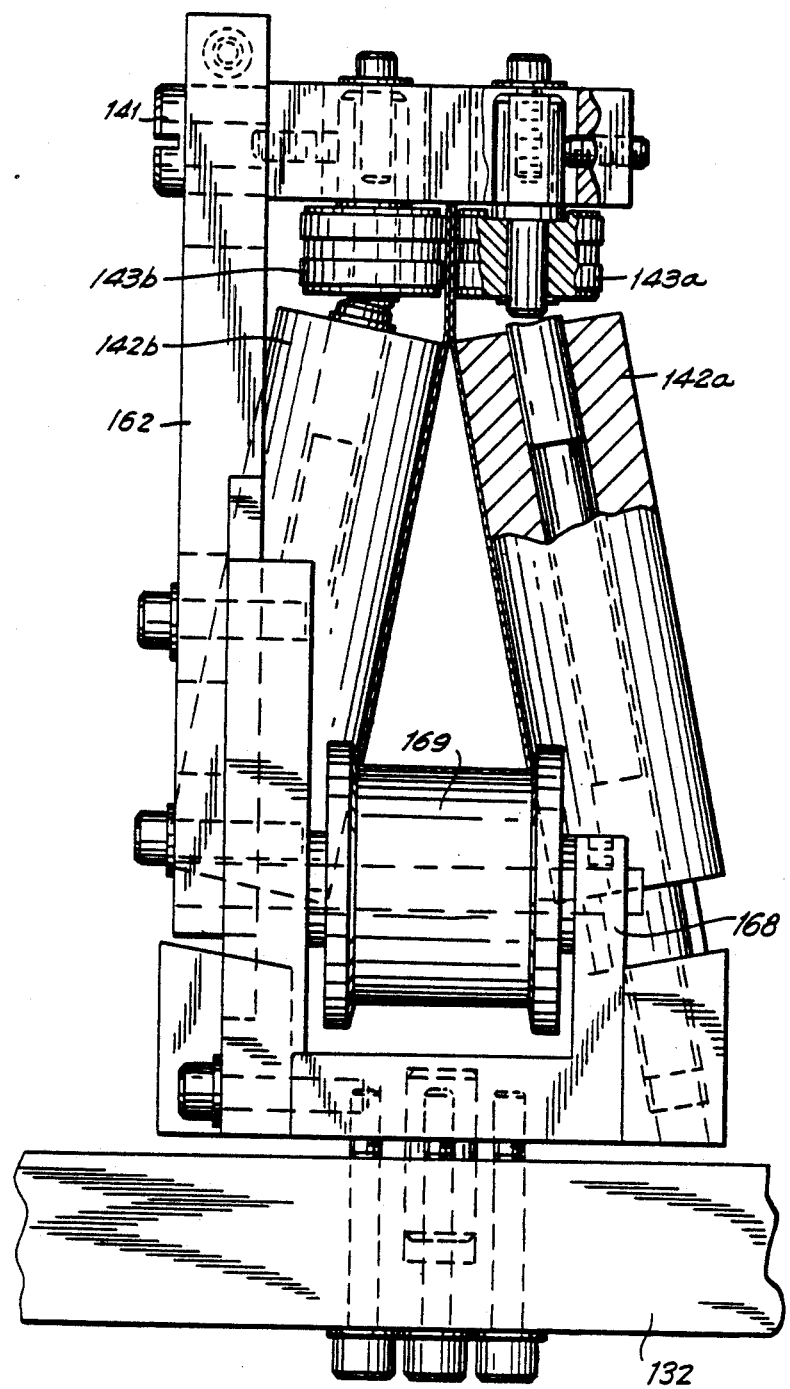
FIG. 12 is a top sectional view of FIG. 9 taken along line 12—12.
Figure 13:
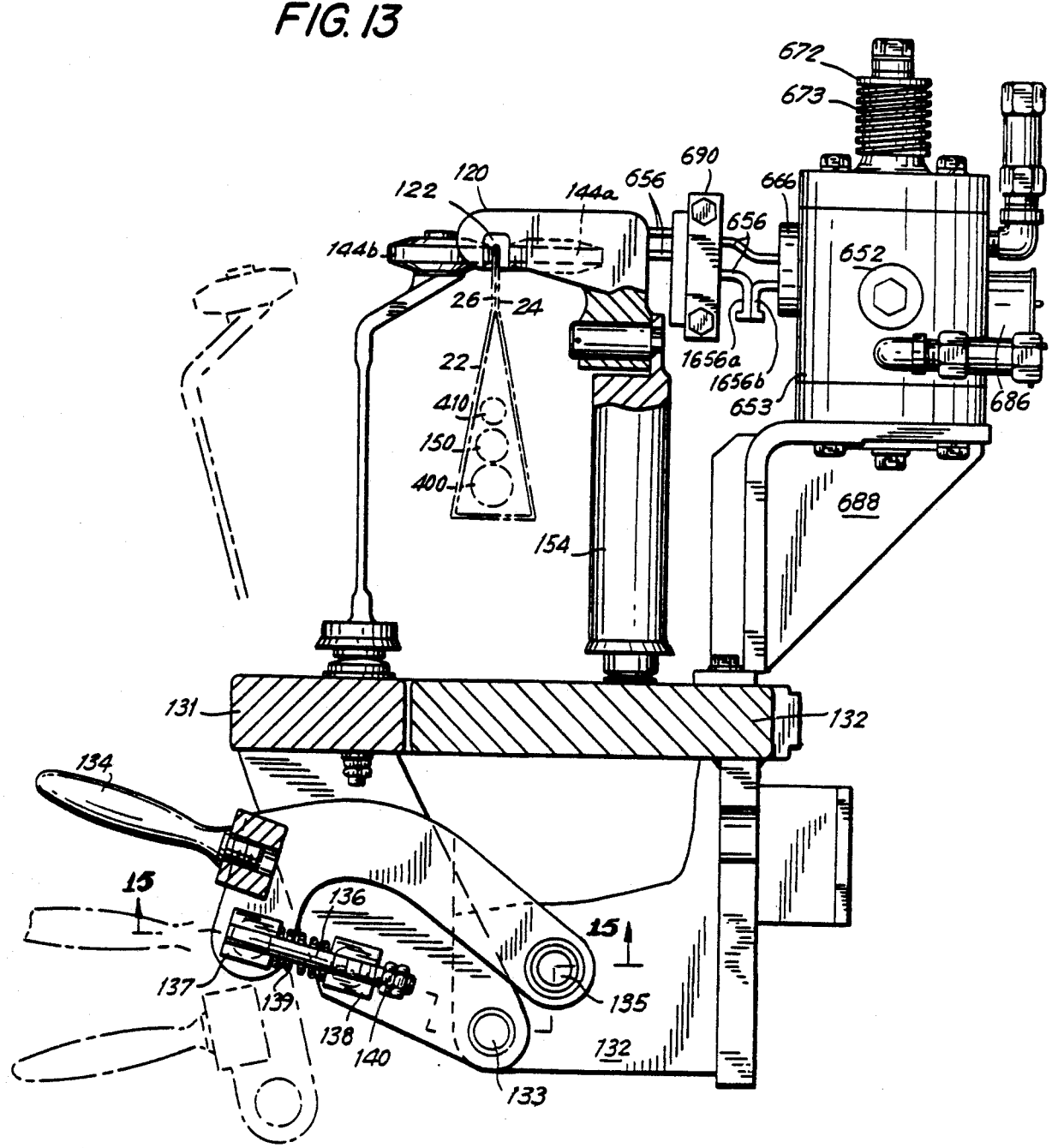
FIG. 13 is a top sectional view of FIG. 9 taken along line 13—13.

Referring to FIGS. 7–18 tube forming section 130 comprises sets of cooperating rollers and guide members mounted on subframes 131 and 132 mounted on frame 11 of machine 10. Subframe 131 is pivotally connected to subframe 132 at post 133 so it can be opened (shown in phantom lines, compare FIGS. 12, 13) for manually feeding web 20 into the proper folded orientation, maintenance, or other machine or web adjustments, and closed (shown in solid lines) for machine operation. Handle 134, shown in FIGS. 13 and 15, is used to open and close subframe 131 relative to subframe 132 in a conventional spring loaded manner. Preferably, handle 134 is pivotally connected to subframe 132 at post 135 and connected to subframe 131 by rod 136 fixedly attached to boss 137 on handle 134 and slideably mounted in boss 138 which is mounted on subframe 131. Spring 139 is mounted about rod 136 between bosses 137 and 138. Adjustment nuts 140 can change the effective length of rod 136 by advancing it through boss 138, and thereby adjusting the tension exerted by spring 139. Bosses 137 and 138 are pivotally mounted in handle 134 and subframe 131 so that the location of pivot points 135, 133, 138, and 137 are such that spring 139 will retain subframe 131 in one of an opened or closed position depending on which side of boss 138 boss 137 is physically located, relative to post 135, either away from tube 22 or towards tube 22 at the extreme range of motion.

The corresponding paired elements mounted on each of subframes 131 and 132 that are substantially similar in structure and function and arranged in opposition are indicated with the "a" suffix, corresponding to subframe 132, or the "b" suffix corresponding to subframe 131, unless otherwise specified. For ease of explanation, only one element may be discussed although the discussion also applies to the opposing element.

Referring to FIG. 12, after exiting guide flanges 74, triangular shaped web contacts guide rollers 142a and 142b which are angled towards each other and angled downwardly from subframe 132 to urge the web side panels 44 and 45 (see FIG. 2) flat and towards each other, thereby folding web 20 about score lines 62 and 63 into substantially triangular tube 22. Guide rollers 142a and 142b may be connected to subframe 132 by conventional gimbol joints (not shown) that provide for adjusting the angular orientation of the rollers within a certain range of angles.

Opposing longitudinal seam pinch or nip rollers 143 press web edges 24 and 26 together superimposed and in alignment under pressure to assist in controlling web advance into coil 120. Edge 24 is the web portion outboard to score line 66 and edge 26 is the web portion outboard of scoreline 66a (see FIG. 2). Referring to FIGS. 7 and 18, roller 143 are rotatably mounted on post 141 in alignment at the end of yoke 162 and exert a force sufficient to press and urge the edges together in longitudinal alignment.

Rollers 143 are canted, i.e., fixed at an angle of about ten to fifteen degrees to the web, to help provide a component of force perpendicular to longitudinal web edge, as the rollers rotate as the web advances, to urge the very edge portion of the web into alignment in conjunction with groove 122 of coil 120 to assure a straight and even longitudinal seam. The angle of cant about post 141 may be adjusted to secure optimal alignment.

Associated with rollers 143 is free running back roller 169 oriented to conact tube 22 transversely. Roller 169 is preferably about the same width as panel 39a of finished brick 31 and is pivotally mounted in bracket 168 to contact the area of web 20 between score lines 62 and 63 in order to aid in creasing score lines 62 and 63 and triangulating what will be the top brick 31 as the vertical or longitudinal seal is made.

The aligned web edges 24, 26 are passed through coil 120 which is energixed to heat the edges. In the preferred embodiment, the seal is formed by the magnetic forces generated by coil 120 to urge the heated longitudinal web edges together. In alternate embodiments, the coil may only heat the web edges so that the seal is formed by pinch rollers or nip rollers pressing the heated web edges together. Arms 153 and 154 are substantially rigid members that secure longitudinal seal coil 120 at the appropriate distance from subframe 132 and prevent coil 120 from moving relative to frame 11. Thus, any tendency of coil 120 to change orientation because of the electromagnetic field generated when coil 120 is energized or vibrations when machine 10 is operating is minimized.

In the preferred embodiment, the currents induced in the opposing polyfoil web edges by coil 120 also produce respective secondary electromagnetic forces of a magnitude related to the induced current density distribution in the edge. The forces, being of opposite polarity, attract. Thus, web edges 24 and 26 in groove 122 exposed to the magnetic field generated by coil 120 will attract and adhere to each other as the thermoplastic softens and melts, fusing together. The seal also may be passed through nip rollers 144a and 144b while the thermoplastic layers of web 20 are still hot so that opposing thermoplastic layers will be more thoroughly fused together mechanically to form a homogeneous hermetic seal. Rollers 144 are mounted at the ends of arms 163 and are urged together under tension with a force sufficient to press the heated web edges together.

Preferably, the longitudinal seal will be made on what will be the bottom panel of the package for both aesthetic reasons and packaging reasons not forming apart of this invention.

Figure 14:
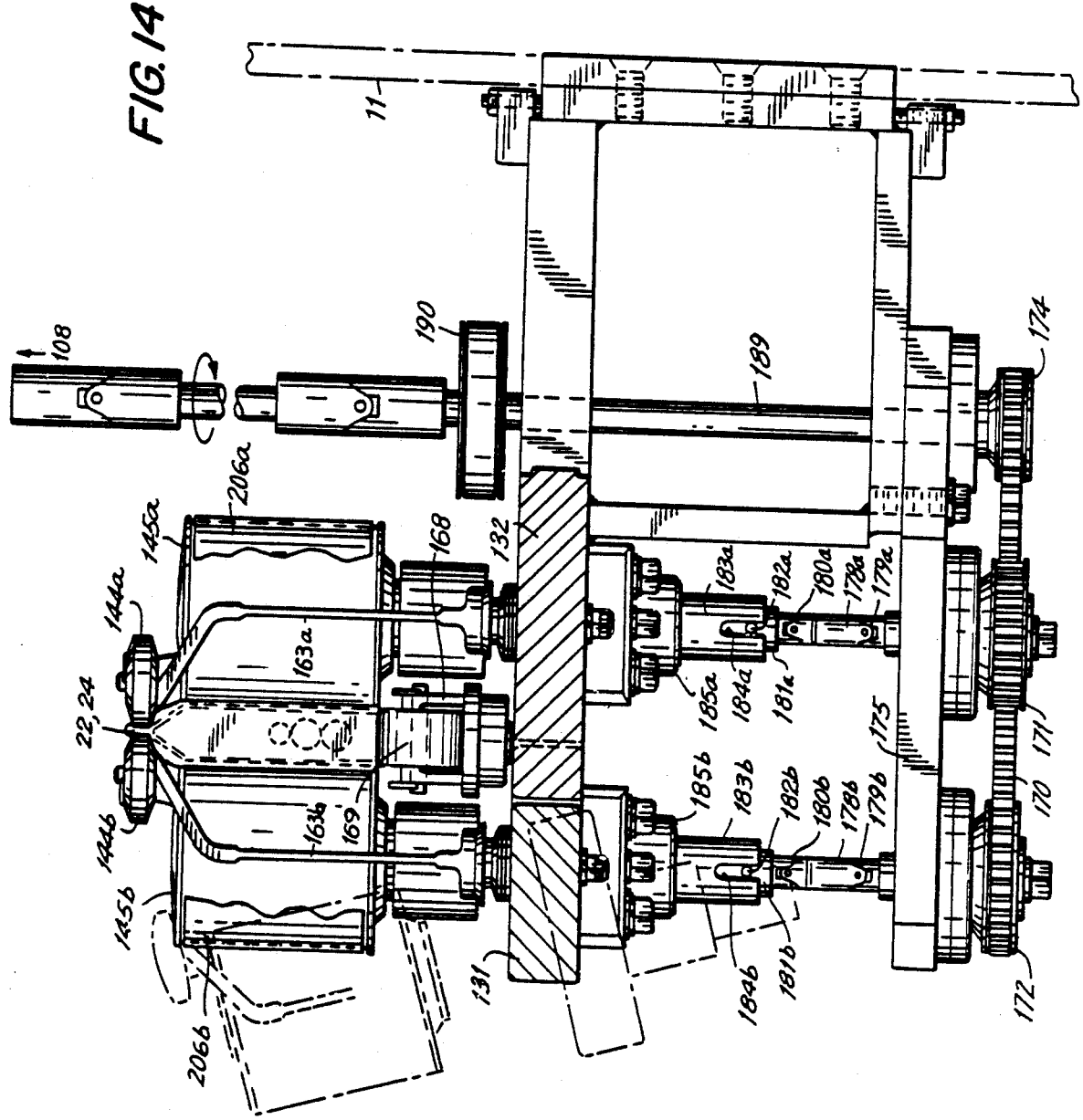
FIG. 14 is a top sectional view of FIG. 9 taken along line 14—14.
Figure 22:
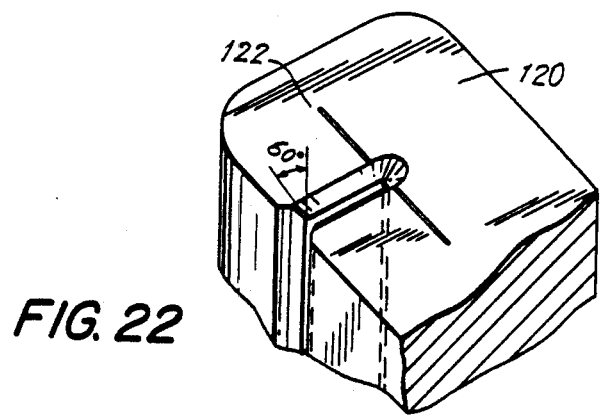
FIG. 22 is an elevated perspective sectional view of the top of the vertical seal induction coil of FIG. 20.
Figure 23:
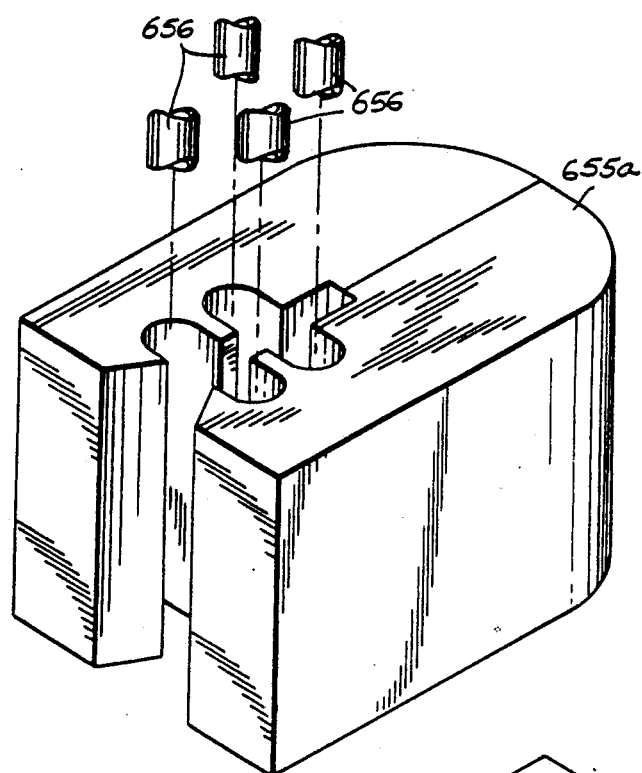
FIG. 23 is a elevated perspective view of the spacer member of FIG. 20 taken along line 23—23.
Figure 24:
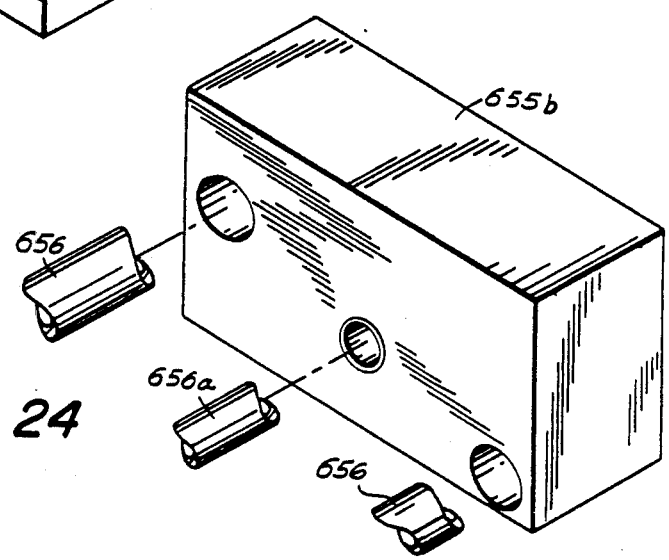
FIG. 24 is an elevated perspective view of the lead spacer taken along line 24—24 of FIG. 20.

After tube 22 is longitudinally sealed, it is advanced and passed between driven pulleys 145a and 145b, and idler pulleys 146a and 146b. Referring to FIGS. 7, 9, 10, 11, 14, 16, and 17, drive pulleys 145a and 145b are arranged substantially in parallel and have belts 206a and 206b passing thereon to frictionally engage the sides of triangular tube 22 to urge tube 22 into a more rectangular form as shown in FIG. 14. Idler pulleys 146a and 146b are disposed below powered pulleys 145a and 145b respectively, but have a smaller radius and are offset to provide belts 206a and 206b with a greater degree of wraparound pulleys 145a and 145b.

Driven pulleys 145a and 145b are driven by belt 170 interconnecting pulley 171 associated with pulley 145a, pulley 172 associated with pulley 145b, takeup pulley 173, and drive pulley 174 mounted to shaft 189. Pulley 173 is mounted on shaft 173' (FIG. 16) and secured to subframe 175 by a threaded bolt and nut arrangement. Tension pulley 173 provides for keeping belt 170 under proper tension and frictionally engaged with pulleys 171, 172, and 174. Pulley 172 is connected to drive pulley 145b by means of shaft 178b having univeral joints 179b and 180b on either end, universal joint 180b being connected to shaft 181b having pin 182b which is adapted to slide in and out of receptacle chamber 183b (having longitudinal slot 184b) which in turn ends in journalled bearing housing 185b mounted on subframe 131. Pulley 171 is similarly connected to drive pulley 145a. Belt 170 is adapted to pass on drive pulleys 145a and 145b in opposite rotations so as to advance tube 22 substantially uniformly. The pin and slot arrangement permits moving subframe 175 relative to subframe 131, for example, to properly align drive pulleys 145 with tube 22, to adjust the delivery of power from a drive means (not shown) to drive pulley 174, or to adapt machine 10 to different dimensioned packages.

Drive pulley 174 is connected to the drive means of machine 10 by shaft 189 through a series of timing belts, gear boxes, and pulleys of various conventional configurations.

Referring to FIGS. 7, 8, 9, and 10 after passing by forming pulleys 145a and 145b, tube 22 is advanced between belts 206a and 206b by opposing guide plates 147a and 147b disposed below pulleys 145a and 145b respectively. Guide plates 147 extend downwardly and inwardly and are spaced apart a distance to aid in controlling the volume of product 32 inside tube 22 and maintain tube 22 along a substantially vertical axis notwithstanding the subsequent package forming operations that move tube 22 out of vertical alignment. Rollers 194a and 194b are rotatably mounted on shafts 204a and 204b. Web belts 206a and 206b (FIGS. 10, 17) are thus fit over respective pulleys 145 and 146 and rollers 194 to frictionally engage tube 22 and advance it as web belts 206 are driven by pulley 145. In the preferred embodiment, rollers 194 have a crowned surface and the ends of shafts 204 may be slotted so that the axis of shaft 204 can be altered or fixed in a position relative to horizontal to maintain the web belt running about its intended path. Thus, the axis of shaft 204 can be adjusted to counteract the forces pulling laterally on tube 22 as it advances and maintain the opposing belts 206a and 206b running vertically on track. Plates 147a and 147b may be spaced apart about the width of a package so that weight of product 32 will cause tube 22 to expand and increase in volume to about the proper package thickness and preferably are tapered to form a slot opening of about one eighth inch to control the tube dimensions prior to transverse clamping and sealing.

Figure 4:
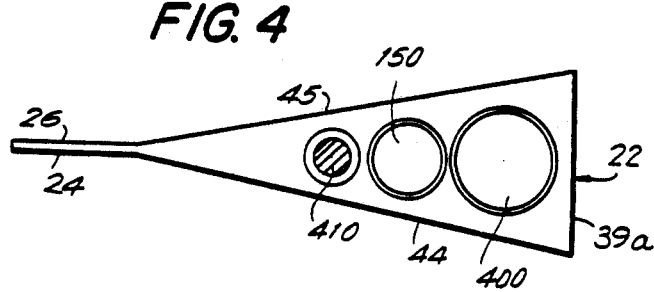
FIG. 4 is a top sectional view of the product fill tubes of the machine of FIG. 1.
Figure 6:
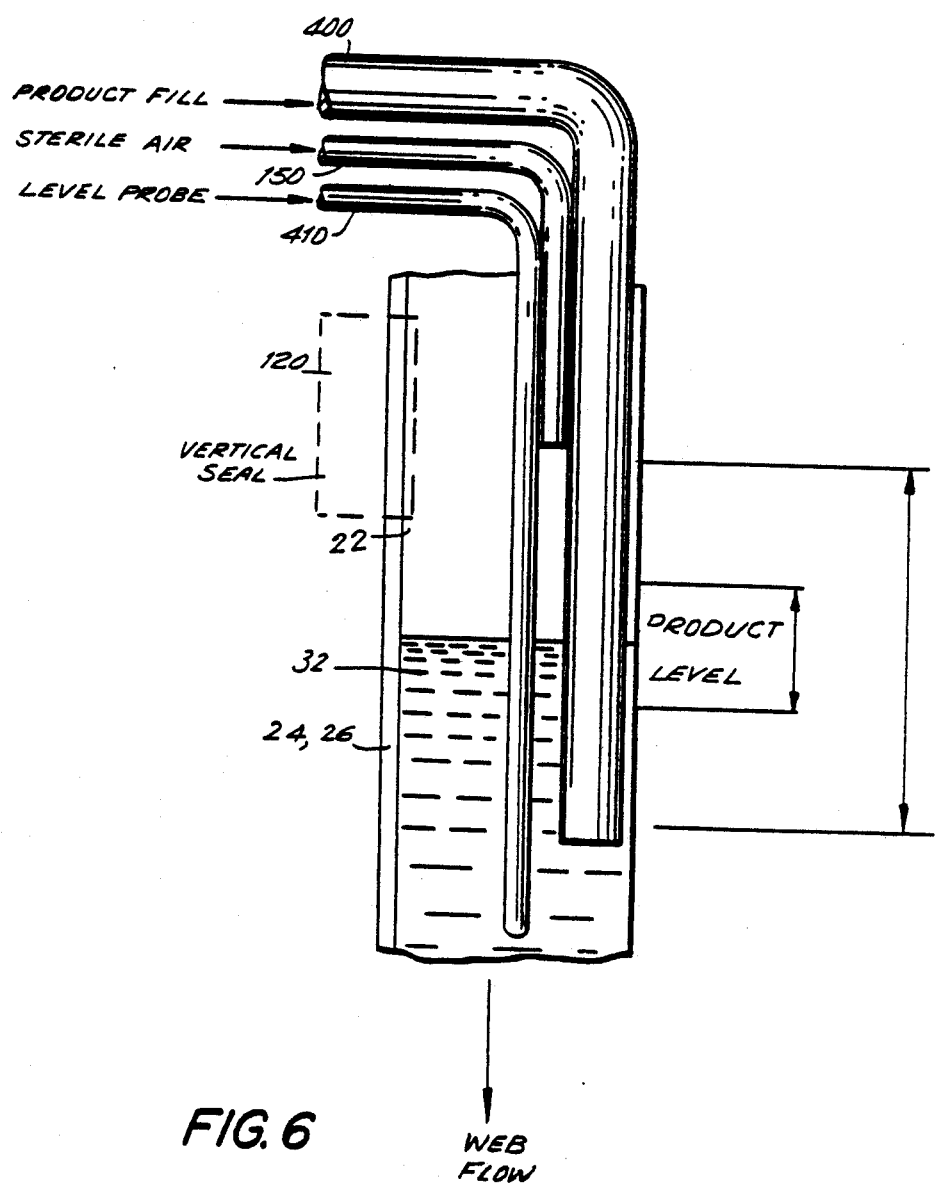
FIG. 6 is a front sectional view of the product fill and sterile air tubes and the product level probe in accordance with the present invention.

Referring to FIGS. 1, 4, and 6, a continuous stream of sterile air at a pressure greater than ambient is forced through conduit 150 to flush the interior of tube 22 and the sterilized web. The sterile air maintains the sterility of tube 22 and folded web 20 as it exits sterile chamber 100 and before it is formed into a tube, filled, and transversely sealed. By providing an above ambient air pressure, the positive sterile air flow substantially minimizes the likelihood of sterilized web contamination by the outside environment. Conduit 150 must terminate far enough above product 32 to not interfere with detecting the level of fill, but not too far to prevent a continuous exchange of sterile air at the product level of fill.

Referring to FIGS. 1, 5, and 6, product 32 is introduced into continuously forming tube 22 by filler tube 400. Product level detector 410 for determining the level of product in the tube is also inserted into tube 22 to detect the level of product 32 in the tube while tube 22 is advanced and formed into packages 30. Filler pipe 400 is intended to terminate well below the product level so that no air bubbles are introduced into product 32 within tube 22 by falling product, agitation, or a vortex action. In the preferred embodiment, product level detector 410 may be a conventional capacitance probe which undergoes a change in impedance in response to the proportion of the probe that is immersed in product 32. That impedance can be correlated to indicate the instantaneous product level position by a microprocessor and used to adjust the rate of fill as discussed below.

In accordance with the preferred embodiment, there is always enough product in the tube for several packages. The instantaneous product level is detected by detector 410 which also is used by a conventional microprocessor to compare the product level to a preestablished overflow shutoff level, underflow shutoff level, and working product range within the shutoff level limits. The rate of fill may be controlled by a microprocessor through use of, for example, a throttling valve to keep the product level within the working range, taking into account surging of the product level within the working range as packages are formed and severed at the end of advancing tube 22.

Referring to FIGS. 19–24, longitudinal seal induction coil 120 comprises a multiple loop coil with half the loops evenly spaced on opposite sides of a longitudinal channel or groove 122 extending along and between the elongated side loop sections of coil 120 (see FIG. 19a). The folded loop configuration increases the radiated field intensity and more evenly distributes the electromagnetic field radiated by coil 120 when energized by induction than would a flat coil. The evenly distributed magnetic field provides for an evenly distributed induced current in, along, and across the current carrying layers of polyfoil web edges 24 and 26 as they advance through the U-shaped groove 122 and provides moderately even heating of the facing thermoplastic layers and, upon cooling, a substantially consistent longitudinal hermetic seal. Groove 122 is adapted to receive web edges 24 and 26 and to keep them aligned while passing therethrough for heating and sealing together when coil 120 is activated the web entrance may have a chamfer of, e.g., 60°, to ease threading web 20 into the groove. See FIG. 24a. The loop of longitudinal seal coil 120 comprises conductive tubing 656 and center tap ground 656a, which maybe secured in nonconductive rigid housing 658, e.g., epoxy, a G-10 epoxy fiberglass material, plastic, or the like. Conductive tubing 656 is preferably hollow copper tubing adapted for having a cooling medium such as water flowing therethrough. Center tapped ground 656a is electrically connected to conductor 656 at location 657 to prevent current arc over to the web during operation. Spacer members 655a and 655b shown in FIGS. 23 and 24 may be used to hold the coil and conductor leads spaced apart in alignment in housing 658 and coil 120.

In the preferred embodiment, the longitudinal seal is formed by intermittent energization of longitudinal seal induction coil 120 and becomes the bottom seal of the package across the package width. The length of coil 120 is approximately equal to or greater than a flattened package width so that longitudinal length of tube 22, corresponding to at least the bottom seal, will pass through the electromagnetic field generated by coil 120 while coil 120 is energized. The rate of web speed and time period that the coil is energized and radiating an electromagnetic field may be coodinated so that the opposing thermoplastic layers will effectively fuse and hermetically seal as a continuous seal, preferably formed in overlapping elements.

The longitudinal sealing operation of the present invention may be powered by a radio frequency generator (not shown), which generates a preselected energy level for forming the vertical seal, e.g., about 3 to 5 kw at about 650 KHz. The r-f generator is electrically connected to longitudinal seal induction coil 120 by conductors 656 an optionally a transverse induction coil through a coupling mechanism 652 not forming a part of this invention.

The power from the r-f generator may be switched by a control circuit to longitudinal seal induction coil 120 in which a current is induced which in turn induces a current in opposing edges 24 and 26 of polyfoil web 20 in U-shaped section 122 of coil 120 for a predetermined period of time. That time period may depend in part upon the speed of polyfoil web 20/tube 22 passing through coil 120, the time coupling mechanism 652 is activated, the physical properties of web 20, the induction coil configuration, and other production parameters.

Referring to FIG. 13 coupling mechanism 652 connects seal coil 120 to the r-f generator. Coupling /mechanism 652 comprises housing 653, an insulating material preferably made of plastic, and may contain a decoupling means to selectively coupled and decouple coil 120 to generator 650. Cooling fluid ports 1656a and 1656b are provided for circulating a cooling fluid through coil 120 in the conductive tubing. The conductive tubing is electrically connected at the ports to maintain a complete electrical circuit.

As tube 22 advances into apparatus 200, it is transversely clamped by one sealing mechanism after another to fix substantially the same volume of product and amount of web between sealing mechanisms for each package, and then sealed in the transversely clamped area. The sealed tube is then severed in the sealed area to form packages by a severing means preferably mounted in the sealing mechanism or located elsewhere on machine 10. The severed packages may then be processed into finished containers 31 by other apparatus also not forming a part of this invention.

We claim:

1. Apparatus for forming a continuous web of polyfoil material into a tube that can be filled with a product and sealed into packages, comprising:
   means for advancing the polyfoil web;
   a frame;
   web guide means for bending the polyfoil web so that the longitudinal edges of the web are gradually brought close together into a superimposed and opposing relationship as the web is advanced along the web guide means;
   a pair of first rollers, mounted on the frame a distance apart, one first roller being disposed on each side of the polyfoil web, the first rollers extending from the frame so as to contact the bent polyfoil web to flatten the portions of the web adjacent to the opposing longitudinal edges as the web advances;
   groove means for receiving and aligning the longitudinal edes of the web disposed proximate to the longitudinal edges of the web as the web advances;
   a pair of second rollers spaced a distance apart and adapted to receive the superimposed and opposing longituidnal edges and pinch them together, the second rollers having parallel axes of rotation that are at an angle to the longitudinal edge of the web so as to exert a component of force on the web edges perpendicular to the direction of advance of the web to urge the edges into the groove means and longitudinally into alignment;
   a third roller mounted in the frame and disposed to contact the web portion between the two flattened web portions to urge the web edges into the groove means, longitudinally aligning the web edges, thereby providing the web with a substantially triangular cross sectional configuration;
   means for heating the opposing longitudinal web edges; and
   a pair of fourth rollers spaced a distance apart and adapted to receive the heated superimposed and contacting longitudinal edges and press them together so that they fuse together to form a homogeneous longitudinal seal.

2. The apparatus of claim 1 wherein the groove means and the means for heating the polyfoil web further comprises:
   a longitudinal induction coil extending for a length, mounted in a fixed relation to the frame, electrically connected to a source of electromagnetic energy and spaced proximate to the web edges so that an electromagnetic field generated by the induction coil will induce a current in and thereby heat the polyfoil longitudinal web edges proximate to the coil; and
   a grooved material adapated for receiving the advancing web edges to align the web edges, the groove being u-shaped and interposed between the web and the coil, the material not adversely affecting the electromagnetic field generated by the coil.

3. The apparatus of claim 2 wherein the longitudinal induction coil is configured to provide a magnetic force that urges the superimposed and opposing longitudinal web edges together when a current is induced in the polyfoil material to bring the heated edges together to form a seal.

4. The apparatus of claim 1 wherein the web guide means further comprises:

a fifth roller for directing the advance of the polyfoil web;

a plate having a top, bottom, and two flanges extending at angles to the plate from the top to the bottom at the edges of the plate and the plate edges being configured so that the distance between the flanges becomes smaller from the top to the bottom, the flanges being angled for receiving the web from the fifth roller and controlling the longitudinal edges of the web as the web advances so that the web is bent to bring the longitudinal edges together in a suprimposed and opposing relationship at the base of the plate.

5. The apparatus of claim 1 further comprising;
a pair of opposing belts for advancing the longitudinally sealed tube, the belts being spaced apart a distance of about a package width to give the tube a more rectangular cross sectional configuration.

6. The apparatus of claim 3 wherein the web guide means further comprises:
a fifth roller for directing the advance of the polyfoil web;

a plate having a top, bottom, and two flanges extending at angles to the plate from the top to the bottom at the edges of the plate and the plate edges being configured so that the distance between the flanges becomes smaller from the top to the bottom, the flanges being angled for receiving the web from the fifth roller and controlling the longitudinal edges of the web as the web advances so that the web is bent to bring the longitudinal edges together in a superimposed and opposing relationship at the base of the plate.

7. Apparatus for forming a continuous web of polyfoil material into a tube that can be filled with a product and sealed into packages, comprising:
means for advancing the polyfoil web;
a frame;
web guide means for bending the polyfoil web so that the web bends as the longitudinal edges of the web are gradually brought close together into a superimposed and opposing relationship as the web is advanced along the web guide means;
a pair of first rollers, mounted on the frame a distance apart, one first roller being disposed on each side of the polyfoil web, the first rollers extending from the frame so as to contact the bent polyfoil web to flatten the portions of the web adjacent to the opposing longituidnal edges as the web advances;
groove means for receiving and aligning the longitudinal edges of the web disposed proximate to the longitudinal edges of the web as the web advances;
a pair of second rollers spaced a distance apart and adapted to receive the superimposed and opposing longitudinal edges and pinch them together, the second rollers having parallel axes of rotation that are at an angle to the longitudinal edge of the web so as to exert a component of force on the web edges perpendicular to the direction of advance of the web to urge the edges into the groove means and longitudinally into alignment;
a third roller mounted in the frame and disposed to contact the web portion between the two flattened web portions to urge the web edges into the groove means, longitudinally aligning the web edges, thereby providing the web with a substantially triangular cross sectional configuration; and
means for inductively heating the opposing longitudinal web edges so that they fuse together to form a homogeneous longitudinal seal.

8. The apparatus of claim 7 further comprising:
a pair of fourth rollers spaced a distance apart and adapted to receive the heated superimposed and contacting longitudinal edges and further press them together to form a homogeneous longitudinal seal.

9. The apparatus of claim 7 wherein the groove means and the means for heating the polyfoil web further comprises:
a longitudinal induction coil extending for a length, mounted in a fixed relation to the frame, electrically connected to a source of electromagnetic energy and spaced proximate to the web edges so that an electromagnetic field generated by the induction coil will induce a current in and thereby heat the polyfoil longitudinal web edges proximate to the coil; and
a groove material adapted for receiving the advancing web edges to align the web edges, the groove being u-shaped and interposed between the web and the coil, the material not adversely affecting the electromagnetic field generated by the coil.

10. The apparatus of claim 9 wherein the longitudinal induction coil is configured to provide a magnetic force that urges the superimposed and opposing longitudinal web edges together when a current is induced in the polyfoil material to bring the heated edges together to form a seal.

11. The apparatus of claim 7 further comprising;
a pair of opposing belts for advancing the longitudinally sealed tube, the belts being spaced apart a distance of about a package width to give the tube a more rectangular cross sectional configuration.

12. Apparatus for forming a continuous web of polyfoil material into a tube that can be filled with a product and sealed into packages, comprising:
means for advancing the polyfoil web;
a frame;
a first roller for directing the advance of the polyfoil web;
a plate having a top, bottom, and two flanges extending at angles to the plate from the top to the bottom at the edges of the plate and the plate edges being configured so that the distance between the flanges becomes smaller from the top to the bottom, the flanges being angled for receiving the web from the first roller and controlling the longitudinal edges of the web as the web advances so that the web is bent to bring the longitudinal edges together in a superimposed and opposing relationship at the base of the plate;
a pair of second rollers, mounted on the frame a distance apart, one second roller being disposed on each side of the polyfoil web, the second rollers extending from the frame so as to contact the bent polyfoil web to flatten the portions of the web adjacent to the opposing longitudinal edges as the web advances;
groove means for receiving and aligning the longitudinal edges of the web disposed proximate to the longitudinal edges of the web as the web advances;
a pair of third rollers spaced a distance apart and adapted to receive the superimposed and opposing longitudinal edges and pinch them together, the third rollers having parallel axes of rotation that are at an angle to the longitudinal edge of the web so as to exert a component of force on the web edges perpendicular to the direction of advance of the web to urge the edges into the groove means and longitudinally into alignment;

a fourth roller mounted in the frame and disposed to contact the web portion between the two flattened web portions to urge the web edges against the groove means, longitudinally aligning the web edges, thereby providing the web with a substantially triangular cross sectional configuration;

a longitudinal induction coil extending for a length, mounted in a fixed relation to the frame, electrically connected to a source of electromagnetic energy and spaced proximate to the web edges so that an electromagnetic field generated by the induction coil will induce a current in and thereby heat the polyfoil longitudinal web edges proximate to the coil, the longitudinal induction coil being configured to provide a magnetic force that urges the superimposed and opposing longitudinal web edges together when a current is induced in the polyfoil material to bring the heated edges together to form a seal; and a pair of fifth rollers spaced a distance apart and adapted to receive the heated superimosed and contacting longitudinal edges and press them together so that they fuse together to form a homogeneous hermetic longitudinal seal.

13. The apparatus of claim 12 further comprising:

a pair of opposing belts for advancing the longitudinally sealed tube, the belts being spaced apart a distance of about a package width to give the tube a more rectangular cross sectional configuration.

* * * * *